(No Model.) 8 Sheets—Sheet 3.
S. C. MENDENHALL.
DRILL TOOTH ATTACHMENT FOR SEEDING MACHINES.

No. 264,319. Patented Sept. 12, 1882.

WITNESSES:
Fred. G. Dieterich.
Jno. W. Stockett

INVENTOR.
S. C. Mendenhall
By DeWitt C. Allen
ATTORNEYS.

(No Model.) 8 Sheets—Sheet 4.
S. C. MENDENHALL.
DRILL TOOTH ATTACHMENT FOR SEEDING MACHINES.
No. 264,319. Patented Sept. 12, 1882.

WITNESSES:
Fred. G. Dieterich
Jno. W. Stockett

INVENTOR.
S. C. Mendenhall
By DeWitt C. Allen
ATTORNEYS.

(No Model.) 8 Sheets—Sheet 5.
S. C. MENDENHALL.
DRILL TOOTH ATTACHMENT FOR SEEDING MACHINES.
No. 264,319. Patented Sept. 12, 1882.

WITNESSES:
Fred. G. Dieterich
Jno. W. Stockett

INVENTOR.
S. C. Mendenhall
By DeWitt C. Allen
ATTORNEYS.

(No Model.) 8 Sheets—Sheet 6.

S. C. MENDENHALL.
DRILL TOOTH ATTACHMENT FOR SEEDING MACHINES.

No. 264,319. Patented Sept. 12, 1882.

WITNESSES:
Fred. G. Dieterich
Jno. W. Stockett

INVENTOR.
S. C. Mendenhall
By DeWitt C. Allen
ATTORNEYS.

(No Model.) 8 Sheets—Sheet 8.

S. C. MENDENHALL.
DRILL TOOTH ATTACHMENT FOR SEEDING MACHINES.

No. 264,319. Patented Sept. 12, 1882.

WITNESSES:
Fred. G. Dieterich
Jno. W. Stockett

INVENTOR.
S. C. Mendenhall
By DeWitt C. Allen
ATTORNEYS.

N. PETERS. Photo-Lithographer, Washington, D. C.

UNITED STATES PATENT OFFICE.

STEPHEN C. MENDENHALL, OF RICHMOND, INDIANA.

DRILL-TOOTH ATTACHMENT FOR SEEDING-MACHINES.

SPECIFICATION forming part of Letters Patent No. 264,319, dated September 12, 1882.

Application filed July 29, 1882. (No model.)

*To all whom it may concern:*

Be it known that I, STEPHEN C. MENDENHALL, a citizen of the United States, residing at Richmond, in the county of Wayne and State of Indiana, have invented certain new and useful Improvements in Drill-Tooth Attachments for Seeding-Machines; and I do hereby declare the following to be a full, clear, and exact description of the invention, such as will enable others skilled in the art to which it appertains to make and use the same.

My invention relates to certain new and useful improvements in the class of grain-drills in which a flexible or spring connection is provided between the drill-tooth and the drag-bar, so that when an obstruction is met by the tooth it can yield rearwardly, and thus pass or slip over it, and then be automatically returned to its normal working position by the force of the spring.

The object of my invention is the production of a yielding connection between the tooth and drag-bar, whereby the tooth can be thrown rearwardly on substantially the same plane with the drag-bar, so as to enable the tooth to pass over any obstructions the drag-bar may pass over, or the tooth thrown forwardly under the drag-bar, on substantially the same plane therewith, when transporting the machine from one field to another, and for shipping purposes; also enabling the tooth to be easily and readily adjusted relatively to the drag-bar to suit different kinds of ground, and also regulate the tension of the spring, as may be found necessary for increasing or decreasing the rigidity of the tooth; and to this end the invention consists in novel features of construction and combination and arrangement of parts, whereby the before-named objects are attained, while at the same time simplifying the construction and rendering the operation of the teeth more efficient, all as will be hereinafter fully described, and set forth in the claims hereto annexed.

Referring to the accompanying drawings, Fig. 15, a side elevation of a modification of my improved attachment, to be hereinafter referred to.

Like letters of reference refer to like parts in the several figures of the drawings.

In the drawings, A represents the usual double drag-bar, and B the drill-tooth, having the usual ear, $b$, to which the rear end of the drag-bar is pivotally connected, and also a series of adjusting-holes, $b'$, and hole $b^2$ for the reception of wooden pins above and below the drag-bar, which is the ordinary method of holding the tooth in position, and which, in case of breakage or disorder of the spring or any parts of the operating mechanism, can be resorted to in order that the operating mechanism may not be injured, but the machine be used until such parts can be repaired.

C represents the spring, formed of one or a series of steel plates, which is adjustably secured at the forward end to the under side of the drag-bar by a clamping-plate, $c$, and a bolt, $c'$, passing through spring, clamping-plate, and drag-bar. The tension of the spring is regulated by a wedge, D, passing between the forward end of spring and the clamping-plate $c$. (Shown more clearly in detail, Fig. 11.) The adjacent faces of the wedge and clamping-plate are provided with a series of transverse serrations or corrugations, $d$, which engage each other, thus securing the parts in position when bolted together. The wedge D is provided with a slot, $d'$, so as to pass on opposite sides of the bolt $c'$. In order to increase or decrease the tension of the spring for giving greater or less rigidity to the drill-tooth, it is only necessary to loosen up the bolt and move or draw the wedge outward to increase the tension and inward to lessen the tension of the spring. It is supposed that each serration or corrugation will represent about five pounds increase or decrease in the power of tension of the spring. The rear end of the spring C is provided with a hooked end, $c^2$, to which is connected the lower end of a stop-lever, E, (shown in detail, Fig. 10,) having its upper slotted end, e, pivotally connected to one end of a bell-crank lever, F, (shown in detail, Fig. 8,) which has its other end pivotally connected by a bar or bars, G, to the ear of the drill-tooth, said levers E F and bar or bars G forming the connection between the spring and ear of the drill-tooth.

H represents a metallic frame formed in two half-sections, H', (one half-section being shown in detail, Fig. 9,) which frame is mounted on top of the drag-bar and secured thereto by a bolt, $h$, passing through the drag-bar and the bars $h'$ of the half-sections, extending down between the parallel bars forming the drag-bar and the bars $h^2$ of the frame H, having right-angled portions $h^3$, engaging the under side of the drag-bar and on opposite sides thereof.

$h^4$ represents a bolt passing through the upper side of the bar $h^2$ and the side flanges, $h^5$, of the frame H, and upon which the bell-crank lever is mounted.

Figure 3:
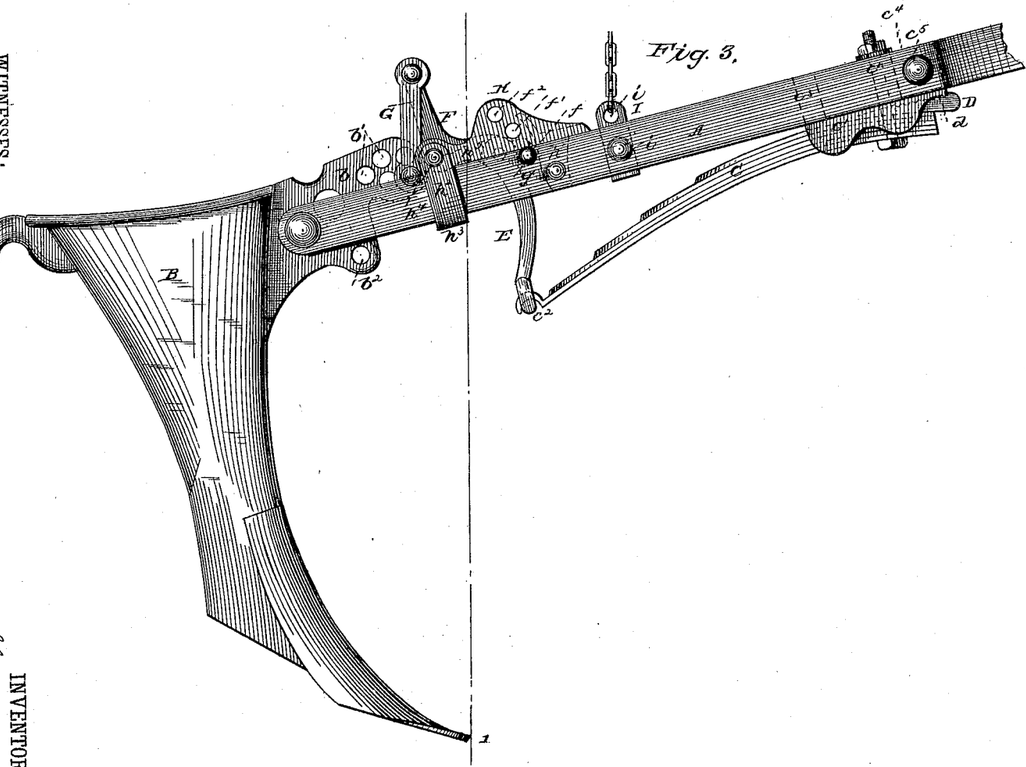
Figs. 3, 4, and 5 are side elevations, showing the parts in position for operation, with the tooth secured in different positions relatively to the drag-bar and ground and secured in any of the above-described positions by the stop-pin $g$.
Figure 4:
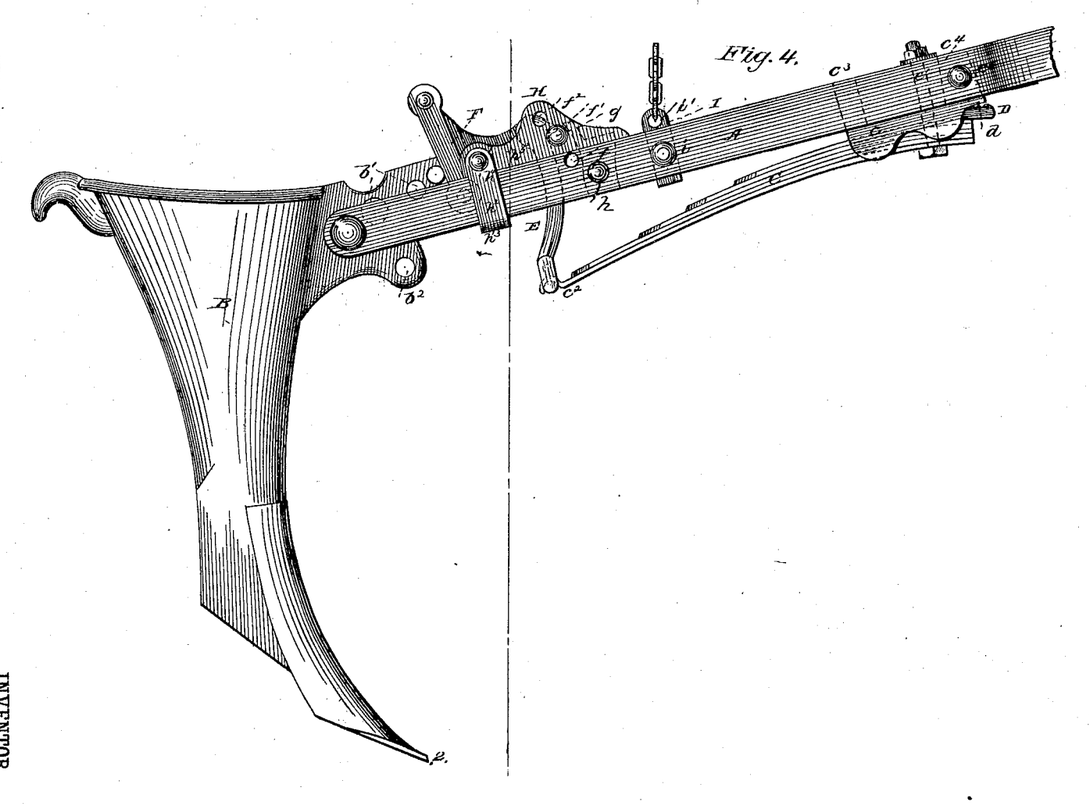
Figure 5:
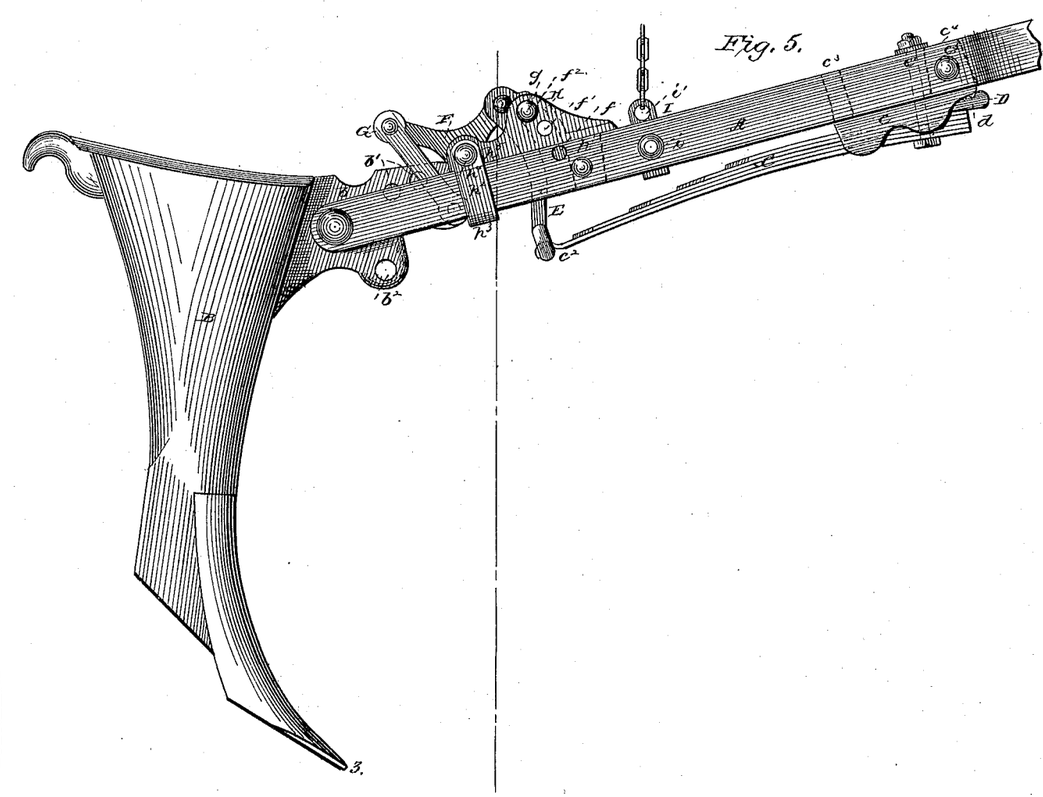
Figure 7:
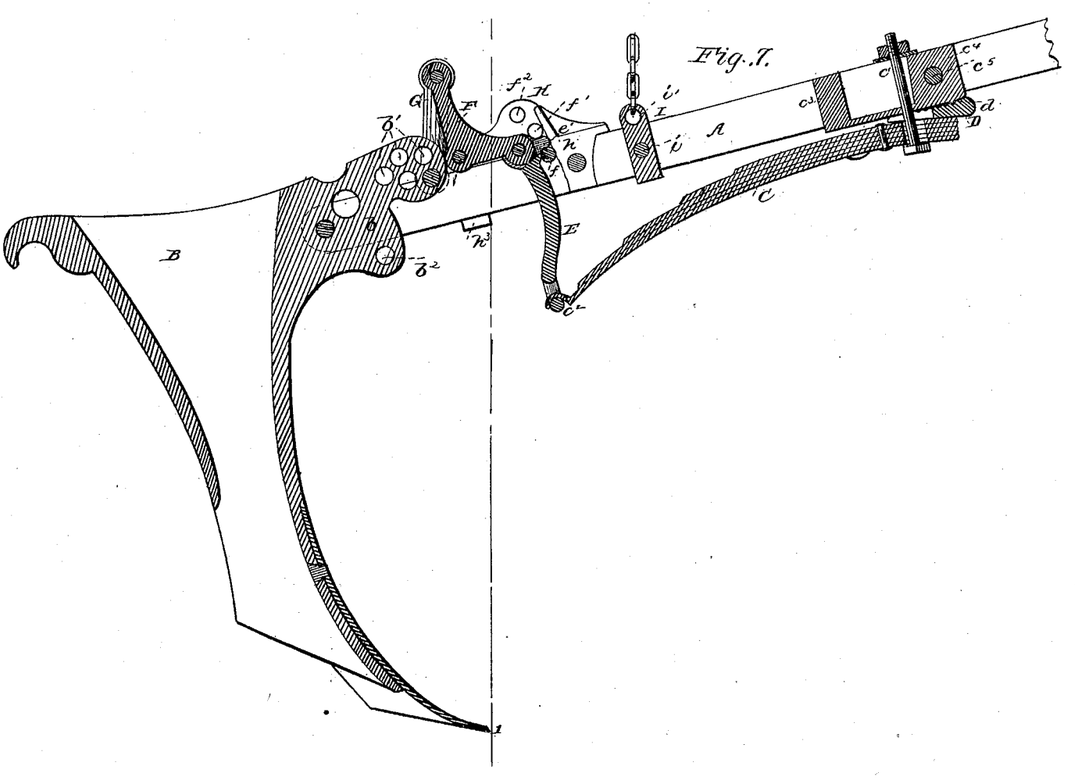
Fig. 7, a vertical longitudinal section through Fig. 3.

$g$ represents a stop-pin passing through the holes $f$ of the drag-bar, upon which rests the extended lugs $e'$ of the upper end of the lever E, for the purpose of securing the drill-tooth in a position with the point thereof at right angles to the drag-bar, or position 1, as shown in Figs. 3 and 7, when working in hard soil, and which pin may be changed to the holes $f'$ of the flanges $h^5$ of the frame for changing the inclination of the drill-tooth to the position 2, as shown in Fig. 4, for working in medium soil, and the pin changed to the holes $f^2$ in flanges $h^5$ of frame H for securing the drill-tooth at a greater inclination to the drag-bar and ground, or to position 3, as shown in Fig. 5, when working in light soil, the lugs $e'$ of lever E always resting on the stop-pin when changed to any of the holes $f, f'$, or $f^2$.

I represents a block arranged between the parallel bars of the drag-bar and secured thereto by a bolt, $i$, passing through it and the drag-bar, forming an additional support for drag-bar, and provided with an eye, $i'$, at its upper end, in which one end of the lifting-chain is secured.

Figures 8, 9, 10, 11, 12, 13, 14:
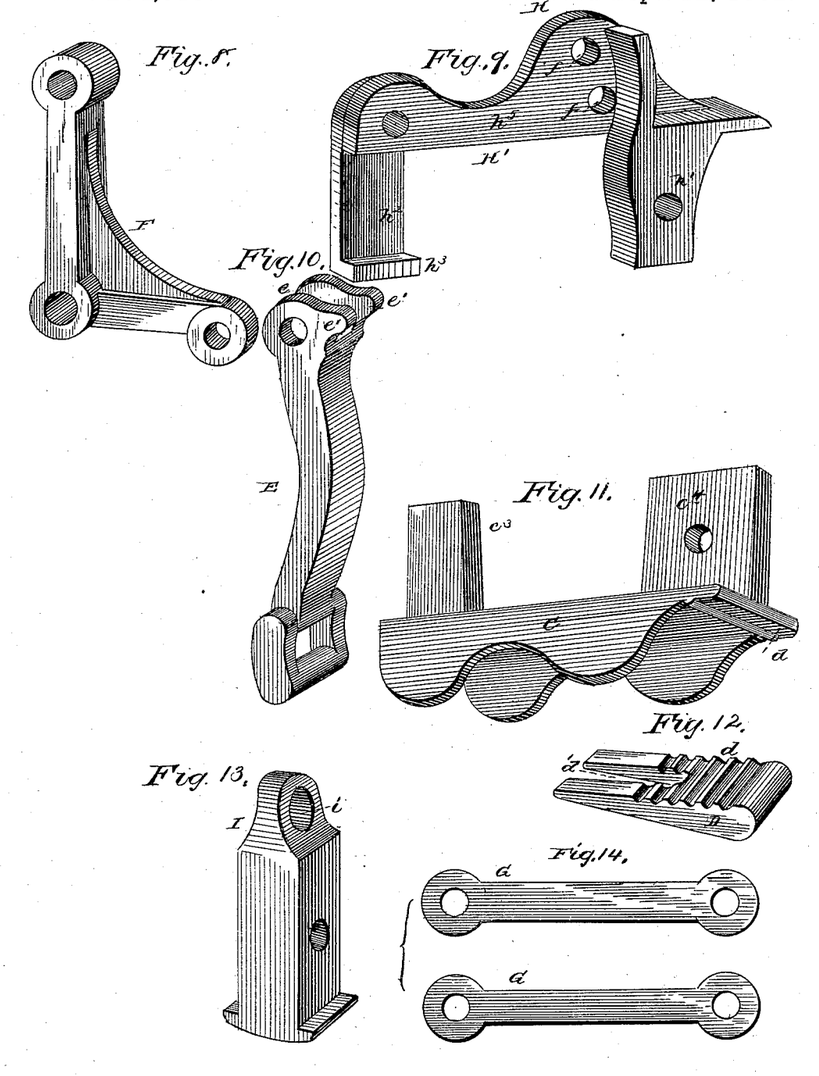
Figs. 8, 9, 10, 11, 12, 13, and 14 are detail or detached views of the several parts forming my improved attachment.

The clamping-plate $c$ is constructed as shown more clearly in detail, Fig. 11, having upwardly-projecting bars $c^3 c^4$, which extend up between the parallel bars of the drag-bar, forming an additional support for said bar, and which plate is secured by a bolt, $c^5$, passing through drag-bar and bar $c^4$ of the clamping-plate.

Figure 15:
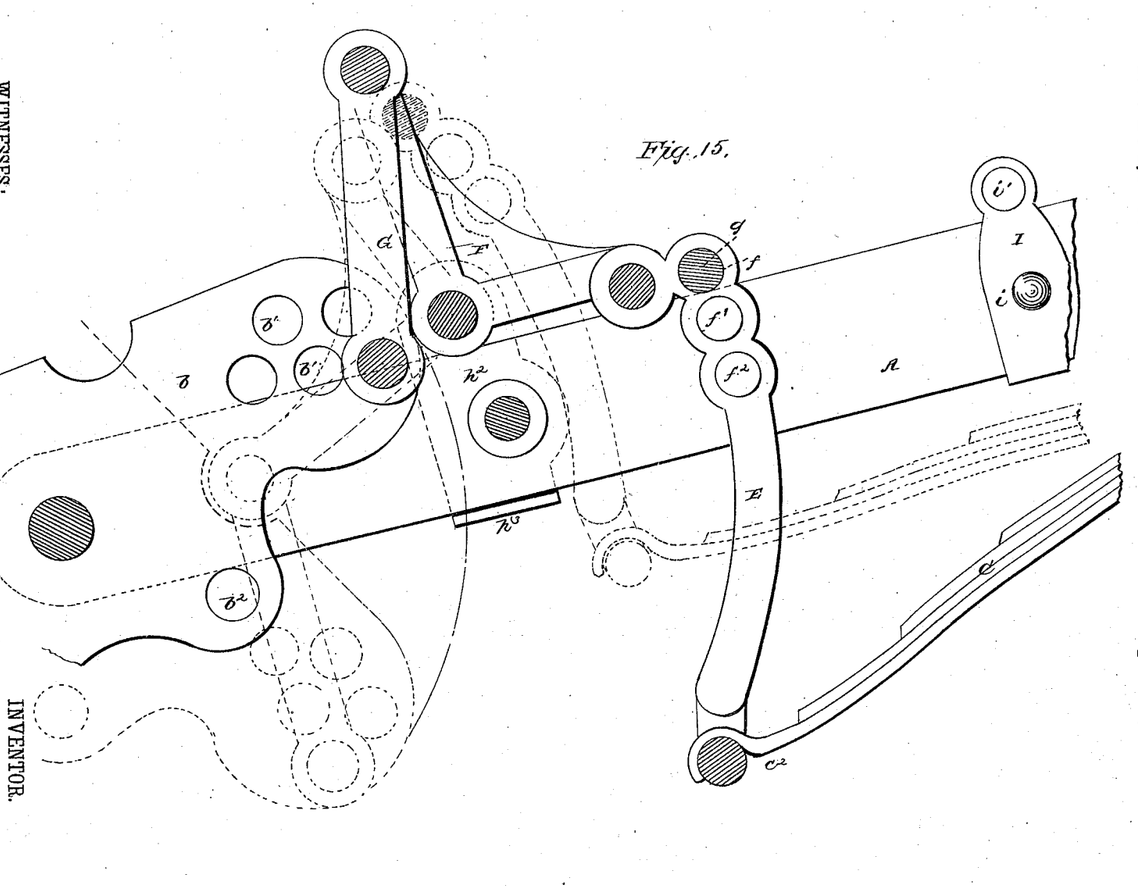

The modification shown in Fig. 15 is merely upon the stop mechanism and metallic frame H, whereby I am enabled to obtain the same positions of the drill-tooth as shown in Figs. 1, 3, 4, 5, and 6, which is accomplished by having the holes $f f' f^2$ through the lever E, and the stop-pin $g$ resting in the holes thereof and impinging against the top edges of the drag-bar, while I am also enabled by this change to dispense with all parts of the metallic frame H with the exception of the depending and clamping bars $h^2$, thus simplifying the general construction of the parts above referred to, while accomplishing the same objects desired to be obtained.

Figures 1, 2:
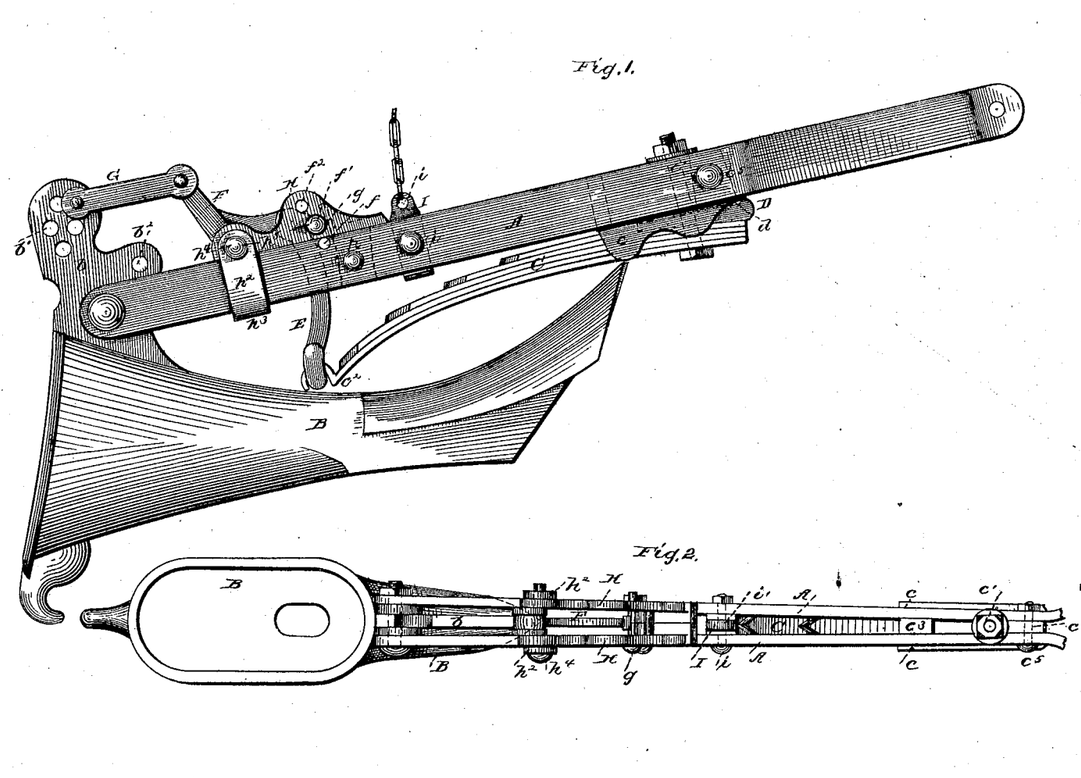
Figure 1 represents a side elevation of the parts of my improved drill-tooth attachment when arranged for transportation.
Fig. 2, a top view or plan of the same.
Figure 6:
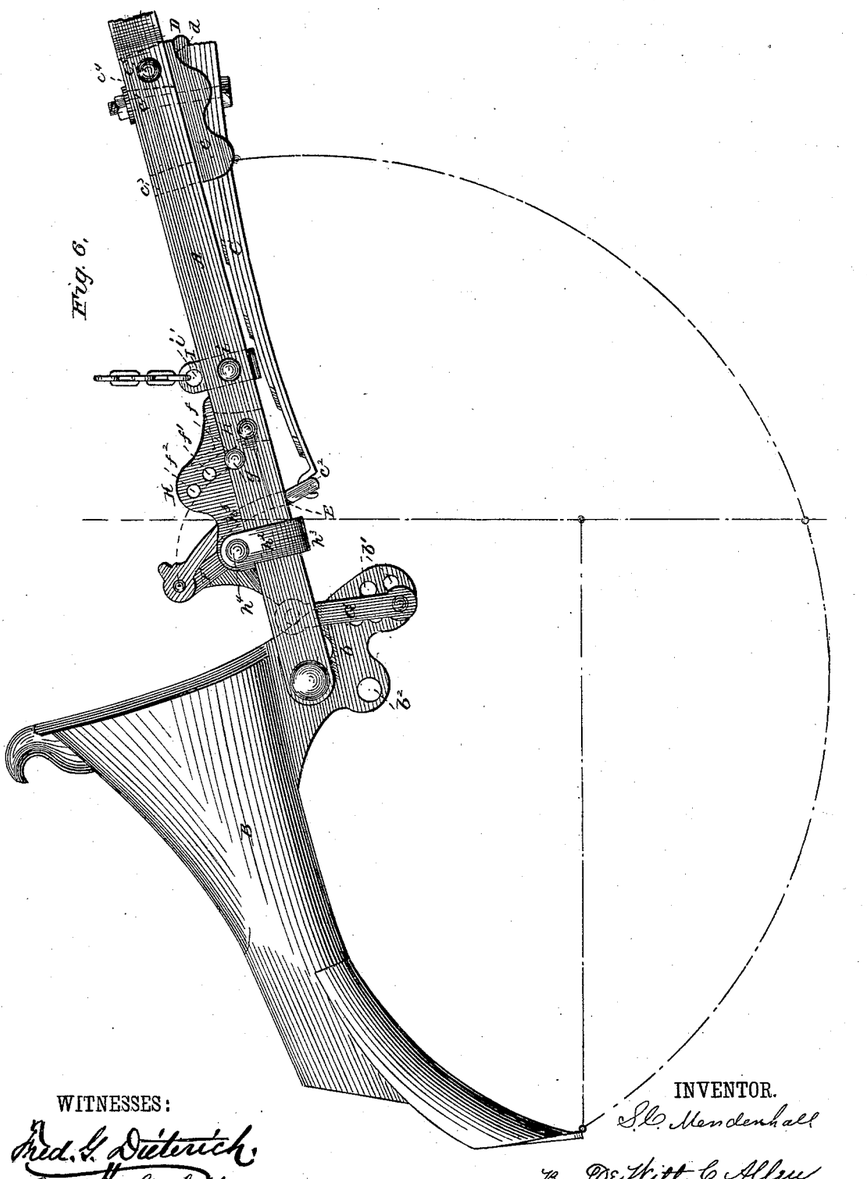
Fig. 6, a side elevation of the parts, showing the tooth thrown to its extreme rearward position.

The operation of my improved attachment being obvious from the foregoing description, it is only necessary to call attention more particularly to the range or circuit the tooth is adapted to receive, which is substantially or nearly a half-circle or a quarter of a circle either forward or backward of the tooth when in position 1, or at right angles with the drag-bar, all as clearly shown in Figs. 1, 3, and 6.

Having thus fully described my invention, what I claim as new, and desire to secure by Letters Patent, is—

1. In a drill-tooth attachment for seeding-machines, the combination, with the drag-bar, drill-tooth, and spring, of mechanism, substantially as described, for connecting the spring and tooth, whereby the said tooth is adapted to occupy positions substantially on the same plane with the drag-bar, either forward or rearward of the point of the tooth, when at right angles therewith, substantially as and for the purpose specified.

2. In a drill-tooth attachment for seeding-machines, the combination, with the drag-bar, the drill-tooth, and spring, of a series of connected levers and bar or bars for connecting the drill-tooth and spring, whereby the drill-tooth is adapted to be thrown forward under the drag-bar and rearwardly of the drag-bar to occupy positions substantially on the same plane therewith, substantially as and for the purpose specified.

3. In a drill-tooth attachment for seeding-machines, the combination, with the drag-bar, tooth, and spring, of the levers E F and bar or bars G, connecting the tooth and spring, arranged to work intermediate of the parallel bars forming the drag-bar, substantially as and for the purpose specified.

4. In a drill-tooth attachment for seeding-machines, the combination, with the drag-bar, spring, and drill-tooth, of the lever E, bell-crank lever F, and bar or bars G, pivotally connected together and to the spring and tooth, substantially as and for the purpose specified.

5. In a drill-tooth attachment for seeding-machines, the combination, with the drag-bar, tooth, and spring, of mechanism for connecting the tooth and spring, whereby the tooth can be thrown forward up under the drag-bar for transportation or shipping purposes, substantially as specified.

6. In a drill-tooth attachment for seeding-machines, the combination, with the drag-bar, tooth, and spring, of the connected levers E F and bar or bars G, connecting the spring and tooth, and an adjustable stop mechanism arranged in front of the drill-tooth and independent thereof, substantially as and for the purpose herein shown and described.

7. In a drill-tooth attachment for seeding-machines, the combination, with the drag-bar, tooth, and spring, of the connected levers, bar or bars for connecting the tooth and spring, and a stop mechanism consisting of one of the connected levers and a stop-pin, substantially as and for the purpose herein shown and described.

8. In a drill-tooth attachment for seeding-machines, the combination, with the drag-bar, tooth, and spring, of the connected levers, bar or bars for connecting the tooth and spring, and an adjustable stop mechanism consisting of one of the connected levers and a stop-pin, substantially as and for the purpose herein shown and described.

9. In a drill-tooth attachment for seeding-machines, the combination, with the tooth, spring, and connecting mechanism, of the drag-bar and frame H, provided with the adjusting-holes $f\ f'\ f^2$, the lever E of the connected levers, provided with the lugs $e'$, and the stop-pin $g$, substantially as and for the purpose specified.

10. The combination, with the double drag-bar, of the frame H, formed in two half-sections and provided with the bars $h'$ and $h^2$, having right-angled portions, substantially as and for the purpose specified.

11. The combination, with the double drag-bar, of the frame H, formed in two half-sections and provided with the bars $h'$, bars $h^2$, having right-angled portions $h^3$, and flanges $h^5$, substantially as and for the purpose specified.

12. The combination, with the double drag-bar and spring, of the intermediate clamping-plate, $c$, provided with the upwardly-projecting bars $c^3\ c^4$, and means for securing them together, substantially as and for the purpose specified.

13. The combination, with the drag-bar and spring, of the intermediate clamping-plate and wedge having transverse serrations or corrugations on their adjacent faces, and a bolt for adjustably securing them together, substantially as and for the purpose specified.

14. In a drill-tooth attachment for seeding-machines, the combination, with the drag-bar, tooth, and spring-bar, of mechanism for connecting the tooth and spring, whereby the tooth can be thrown forward up under the drag-bar for transportation or shipping purposes, and a stop-pin for locking the tooth in said position, substantially as specified.

In testimony whereof I affix my signature in presence of two witnesses.

STEPHEN C. MENDENHALL.

Witnesses:
  D. C. ALLEN,
  J. G. HINKEL.